United States Patent [19]

Lin

[11] Patent Number: 4,623,558

[45] Date of Patent: Nov. 18, 1986

[54] REACTIVE PLASTISOL DISPERSION

[75] Inventor: Shiow C. Lin, Ellicott City, Md.

[73] Assignee: W. R. Grace & Co., New York, N.Y.

[21] Appl. No.: 738,809

[22] Filed: May 29, 1985

[51] Int. Cl.$^4$ .............................. B05D 3/06
[52] U.S. Cl. ..................... 427/44; 427/54.1;
522/90; 522/100; 522/104; 522/142; 522/146; 525/391; 525/396
[58] Field of Search ............... 427/44, 54; 525/391, 525/396

[56] References Cited

U.S. PATENT DOCUMENTS

| | | | |
|---|---|---|---|
| 3,356,761 | 12/1967 | Fox | 525/391 |
| 3,557,045 | 1/1971 | Wright et al. | 525/391 |
| 3,586,736 | 6/1971 | Takemura et al. | 525/391 |
| 4,020,966 | 5/1977 | Wszolek . | |
| 4,125,700 | 11/1978 | Graham . | |
| 4,315,086 | 2/1982 | Ueno et al. | 525/391 |
| 4,496,695 | 1/1985 | Sugio et al. | 525/396 |
| 4,503,186 | 3/1985 | Sugio et al. | 525/391 |
| 4,537,805 | 8/1985 | Lin | 427/54.1 |

FOREIGN PATENT DOCUMENTS

| | | |
|---|---|---|
| 2162894 | 8/1973 | Fed. Rep. of Germany . |
| 47-40853 | 10/1972 | Japan . |
| 52-53973 | 4/1977 | Japan . |
| 52-30978 | 8/1977 | Japan . |
| 55-52335 | 4/1980 | Japan . |
| 55-21474 | 6/1980 | Japan . |
| 56-100841 | 8/1981 | Japan . |
| 57-151624 | 9/1982 | Japan . |
| 58-69052 | 4/1983 | Japan . |
| 58-69046 | 4/1983 | Japan . |
| 58-84844 | 5/1983 | Japan . |
| 2065143 | 6/1981 | United Kingdom . |

OTHER PUBLICATIONS

G. P. Cowperthwaite, SPE Journal, 29, 56, 1973.
Bucknall et al., The British Polymer Journal, vol. 15, Mar. 1983, pp. 71–75.

*Primary Examiner*—John H. Newsome
*Attorney, Agent, or Firm*—Richard P. Plunkett; William W. McDowell, Jr.

[57] ABSTRACT

This invention relates to a thermosetting plastisol dispersion composition comprising (1) poly(phenylene oxide) (PPO) in powder form, which is insoluble in the reactive plasticizer at room temperature and plasticizable at a temperature at or above the fluxing temperature;

(2) a liquid reactive plasticizer member of the group consisting of (a) at least one epoxide resin having an average of more than one epoxide group in the molecule, (b) at least one liquid monomer, oligomer or prepolymer containing at least one ethylenically unsaturated group and (c) a mixture of (a) and (b); said liquid reactive plasticizer being capable of solvating the PPO at the fluxing temperature and being present in an amount ranging from 5 to 2,000 parts per 100 parts by weight of (1); and (3) 0.01 to 10% by weight of (2) of either a thermal initiator or photoinitiator for plasticizers present in the composition.

The plastisol dispersion after fluxing can form a thermoset after the crosslinking reaction.

18 Claims, No Drawings

REACTIVE PLASTISOL DISPERSION

BACKGROUND OF THE INVENTION

1. Field of the Invention

This invention relates to a thermosettable polyphenylene oxide (PPO) plastisol dispersion composition which, on heating at or above the fluxing temperature but below the flow temperature of the PPO, rapidly provides handling strength through plasticization and which can be crosslinked to give a thermoset on further heating or irradiation.

The invention also relates to a process for forming a crosslinked polymeric material and fiber reinforced prepregs and composites.

A polymeric material containing the following recurring structural units:

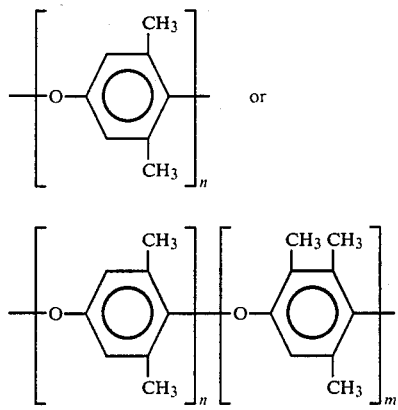

wherein n is much greater than m, will both be referred to herein as poly(phenylene oxide) (PPO).

2. Description of Prior Art

In general, a plastisol is composed of a high molecular weight polymer dispersed in a plasticizer which is a material incorporated in a plastic to increase its workability. Upon heating, the plastisol turns to a pregelled dispersion, to a gelled dispersion and then to a fused dispersion. The viscosity of a plastisol decreases with the increase of temperature at the beginning. At a certain temperature, suddenly, the viscosity increases sharply and the liquid dispersion turns to an opaque solid, a gelled dispersion. This temperature is called minimum fluxing temperature defined as the temperature at which a plastisol develops sufficient physical integrity to permit being lifted from the fusion plate. Upon further heating at a higher temperature, the plastisol turns to a clear plasticized plastic.

To prepare a plastisol, two basic ingredients, a high molecular weight polymer powder and a liquid plasticizer, are required to form a stable dispersion after blending. Physically, the plasticization process of a plastisol is the permeation of the plasticizer into the polymer particle to solvate the polymer molecules. The permeation rate (P) depends on the diffusion speed of the plasticizer (D) and the interaction between the plasticizer and the polymer (S):

$$P = D \times S$$

Under the assumption that a polymer is compatible with a certain plasticizer, two important factors, the molecular weight (size) and the structure of polymer and plasticizer, should contribute to the stability of a plastisol which is determined by the diffusibility of the plasticizer upon aging. A stable dispersion should not allow the diffusion to occur at or below storage temperature. To prevent a plasticizer from diffusing, the size of the plasticizer molecules has to be larger than that of the polymer free volume. Upon heating, the free volume increases with temperature and allows the plasticizer molecule to diffuse into a polymer particle when the temperature is high enough.

Besides the kinetic process of plasticization, the capability of plasticization also depends on thermodynamic parameters. The plasticization should not occur when the free energy of mixing is greater than or equal to zero ($\Delta G_m \geq 0$), even if the size of the plasticizer is as ideal as described above.

Poly(vinyl chloride) and its copolymers, because of their low degradation temperature, eliminate hydrogen chloride and form a colored product below their melting temperature. Therefore, to use a melt process for these polymers without adding a plasticizer is difficult. The invention of plastisol technology has allowed these polymers to have excellent applicability and become the major polymers used in the plastisol industry. Unfortunately, the degradation of these polymers in service conditions is still an unacceptable problem in some applications due to hydrogen chloride elimination which promotes corrosion in metal and a reduction of polymer strength.

To stabilize PVC plastisols in service and to enhance their service life, a crosslinkable, secondary plasticizer has been incorporated with a primary plasticizer for plastisol preparation. The secondary crosslinkable plasticizer includes reactive vinyl compounds such as trimethylolpropane trimethacrylate and tetraethylene glycol dimethacrylate [Dainippon, JP80 52,335 (1980)]; G. F. Cowperthwalte, SPE Journal, 29, 56, 1973], unsaturated polyesters [Dainippon, JP80 21,474 (1980)], diallyl compounds [Shin-Nippon Rika, JP72 40,853 (1972)], and epoxy resins [Dunlop, JP81 100,841 (1981)].

To further improve the structural properties and eliminate the problem of hydrogen chloride release of the PVC plastisol, the plastisol technology was extended to acrylic polymers for the preparation of thermally fusible acrylic plastisols. See U.S. Pat. No. 4,125,700, which used esters as plasticizers and polyol acrylates as reactive diluents to prepare various reactive acrylic plastisols which formed a plasticized semi-interpenetrating network after the crosslinking reactions.

U.S. Pat. No. 4,020,966 also teaches a plastisol composition containing as a resin component a copolymer of a normal alpha-olefin and maleic anhydride in combination with a plasticizer and a reactive polyepoxide plasticizer.

The use of epoxy for making thermosetting epoxypoly(phenylene oxide) blend has been reported. However, to disperse a powdered poly(phenylene oxide) in a thermosetting resin for making a reactive plastisol, which can be plasticized into a continuous solid material by the thermosetting resin at a temperature well below the flowing temperature of the polymer, is novel. The plasticized solid material becomes a thermoset after the crosslinking reaction.

Using solution casting, a mixture of poly(oxy-1.4-phenylene), epoxy resin and epoxy curing agent dissolved in an organic solvent such as toluene, a mixture of methyl ethyl ketone and toluene, or methylene chloride, was cast into film and the phase separation phenomenon studied after curing [British Polymer J., 15 (1), 71–5 (1983)]. The solution was also used to impregnate glass and Nomex fiber fabrics for making composites. [JP77 30978; JP77 53973, JP82 151624; JP83 69052, JP83 69046; JP83 84844]. This process involved the use of an organic solvent and caused an emission problem. The removal of solvent in film casting increases the cost of the process due to the expensive solvent and energy consumption. Furthermore, the time required for removing the solvent is another concern of production efficiency. Therefore, a high solid thermosetting composition is a superior choice rather than solvent casting.

German Offenlegungsschrift No. 21 62 894 teaches the use of epoxy resin-poly(phenylene oxide)-glass fiber blend for injection molding application at melt condition (330° C.). In the patent, the blend contains no curing agent because of the potential problem of the crosslinking reaction of epoxy resin at the extrusion temperature. Using a curing agent in the process would produce a cured epoxy material in the extruder before injection. A similar approach was also described in Japanese Patent No. J73039017.

This invention relates to the application of the plasticization principle, originally developed for PVC plastisols, to prepare non-PVC reactive plastisols from poly(phenylene oxide). The advantages of this approach include: (1) the elimination of an organic solvent; (2) a fast B-stage formation through plasticization at a temperature much lower than the melt temperature of the polymer; and (3) the presence of a crosslinking agent without the risk of curing at the processing temperature.

To prepare a pumpable thermosetting material, the instant invention discloses the dispersion of PPO powder in a reactive plasticizer such as liquid epoxy resin, liquid acrylic resin or the mixture of the two. This invention concerns the preparation of an ideal reactive plastisol which is a system containing a non-reactive polymer powder dispersed in a thermosetting plasticizer. The ideal reactive plastisol converts to a fused plastisol at minimum fluxing temperature, turns to a clear plasticized polymer at clear point and changes to a thermoset material after the crosslinking reaction. The characteristics of the reactive plasticizer thus include: wide compatibility with the polymer; low vapor pressure; high plasticization efficiency; excellent aging stability upon storage and crosslinkability upon curing.

This invention particularly concerns a class of reactive plastisols prepared from a PPO polymer powder and a reactive plasticizer or a combination of reactive plasticizers.

In reactive plastisol technology, which is a combination of plastisol and thermosetting technologies, the dispersion fuses into a plasticized solid at a temperature much lower than the melting point. Because the fluxing process is extremely quick, the thermosettable material provides a handling strength or B-stage strength in a few seconds. The final cure to a thermoset material can then be made to occur either by subsequent heating to the cure temperature or by irradiation, e.g., UV in the presence of a photoinitiator or by high energy ionizing radiation.

OBJECTS OF THE INVENTION

One object of the instant invention is to produce a novel process and composition. Another object of the instant invention is to produce a plastisol composition which is useful as a prepreg or composite. Yet another object of the instant invention is to produce a plastisol composition which on curing substantially minimizes or precludes exuding or extraction of the plasticizer. Still another object of the invention is to produce a plastisol composition which on heating to the fluxing temperature acquires handling strength and cures to a thermoset at or above said fluxing temperature. Yet another object of the invention is to produce a plastisol composition which on heating to the fluxing temperature acquires handling strength and cures to a thermoset on subjection to radiation. A further object of the instant invention is to produce a process which comprises heating a reactive plastisol composition to at least its fluxing temperature but below the flow temperature of the thermoplast to flux the plastisol and develop handling strength and, thereafter, obtain a thermoset material by heating above its curing temperature or by irradiation. Other objects will become apparent from a reading hereinafter.

DESCRIPTION OF THE INVENTION

This invention relates to a reactive plastisol dispersion composition comprising (1) poly(phenylene oxide) (PPO) in powder form, which is insoluble in the reactive plasticizer at room temperature and plasticizable at a temperature at or above the fluxing temperature;

(2) a liquid reactive plasticizer member of the group consisting of (a) at least one epoxide resin having an average of more than one epoxide group in the molecule, (b) at least one liquid monomer, oligomer or prepolymer containing at least one ethylenically unsaturated group and (c) a mixture of (a) and (b); said liquid reactive plasticizer being capable of solvating the PPO at the fluxing temperature and being present in an amount ranging from 5 to 2,000 parts per 100 parts by weight of (1); and (3) 0.01 to 10% by weight of (2) of either a thermal initiator or photoinitiator for plasticizers present in the composition.

The plastisol dispersion after fluxing can form a thermoset after the crosslinking reaction.

The plastisol of the invention operates in the same method as conventional plastisols. That is, herein the term "plastisol" refers to dispersions of finely divided plastic resin particles in a liquid non-volatile plasticizer in which the resin is insoluble and cannot be swollen by the plasticizer at room temperature. However, at elevated temperatures, the resin fluxes, i.e., is substantially completely plasticized by the plasticizer so that a homogeneous, solid solution is obtained which forms a rubbery plastic mass. At this point the plastisol has handling mechanical strength. Further heating at or above the fluxing temperature or irradiation results in a thermoset material with ultimate structural strength. In addition to the PPO resin and the plasticizer, the formulation may also contain latent curing agents such as thermal initiators and photoinitiators, electrically conductive particles, fillers, pigments, stabilizers and various conventional compound ingredients.

The plastisol compositions herein are formed by admixture of 100 parts by weight of the PPO resin particles with about 5 to 2,000 parts by weight of plasticizer per 100 parts of resin and, when necessary, contain 0.01% to 10% by weight of the plasticizer of either a latent thermal initiator or a photoinitiator. Thereafter, the plastisol admixture is heated at a temperature at or above the fluxing temperature which is lower than the melting point of the PPO resin for a time sufficient to plasticize the resin by the plasticizer to obtain a homogeneous, solid solution which is a rubbery mass, i.e., a fluxed product.

The PPO particles used herein have a particle size in the range from about 0.01 to about 1,500 microns.

The epoxy resin to be used in the composition of the invention as a liquid reactive plasticizer comprises those materials possessing more than one epoxy, i.e.,

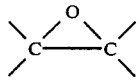

group. These compounds may be saturated or unsaturated, aliphatic, cycloaliphatic, aromatic or heterocyclic and may be substituted with substituents, such as chlorine, hydroxyl groups, ether radicals and the like.

The term "epoxy resin" when used herein and in the appended claims contemplates any of the conventional monomeric, dimeric, oligomeric or polymeric epoxy materials containing a plurality, more than one, e.g., 1.1, epoxy functional groups. Preferably, they will be members of classes described chemically as (a) an epoxidic ester having two epoxycycloalkyl groups; (b) an epoxy resin prepolymer consisting predominately of the monomeric diglycidyl ether of bisphenol-A; (c) a polyepoxidized phenol novolak or cresol novolak; (d) a polyglycidyl ether of a polyhydric alcohol; (e) diepoxide of a cycloalkyl or alkylcycloalkyl hydrocarbon or ether; or (f) a mixture of any of the foregoing. To save unnecessarily detailed description, reference is made to the Encyclopedia of Polymer Science and Technology, Vol. 6, 1967, Interscience Publishers, New York, pages 209–271, incorporated herein by reference.

Suitable commercially available epoxidic esters are preferably, 3,4-epoxycyclohexylmethyl 3,4-epoxycyclohexanecarboxylate (Union Carbide ERL 4221, Ciba Geigy CY-179); as well as bis(3,4-epoxy-6-methylcyclohexylmethyl)adipate (Union Carbide ERL 4289); and bis(3,4-epoxycyclohexylmethyl)adipate (Union Carbide ERL 4299).

Suitable commercially available diglycidyl ethers of bisphenol-A are Ciba Geigy Araldite 6010, Dow Chemical DER 31, and Shell Chemical Epon 828 and 826.

A polyepoxidized phenol formaldehyde novolak prepolymer is available from Dow Chemical DEN 431 and 438, and a polyepoxidized cresol formaldehyde novolak prepolymer is available from Ciba-Geigy Araldite 538.

A polyglycidyl ether of a polyhydric alcohol is available from Ciba Geigy, based on butane-1,4-diol, Araldite RD-2; and from Shell Chemical Corp., based on glycerine, Epon 812.

A suitable diepoxide of an alkylcycloalkyl hydrocarbon is vinyl cyclohexene dioxide, Union Carbide ERL 4206.

Other examples include the epoxidized esters of the polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil and the like.

In the instance when the reactive plasticizer is (b) a liquid monomer, oligomer or prepolymer, for example, an acrylate, i.e., an acrylate terminated prepolymer, of the formula:

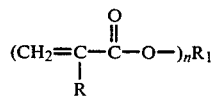

wherein R is H or $CH_3$, $R_1$ is an organic moiety and n is 1 or more, the compound can be made by various reactants and methods. One of these acrylate terminated materials is a polyether polyol urethane polyacrylate formed by reacting a polyether polyol with a polyisocyanate and end-capping the remaining NCO group with a hydroxyalkyl acrylate Another material may be a polyester polyol urethane polyacrylate formed by reacting a polyester polyol with a polyisocyanate and end-capping the remaining NCO group with a hydroxyalkyl acrylate. Still another material in this category is an epoxy acrylate formed by reacting a diepoxide with acrylic acid. Acrylate or methacrylate ester of an epoxy resin used herein are commercially available materials. One of such materials is Shell Co.'s Epocryl Resin-370 having the idealized structure:

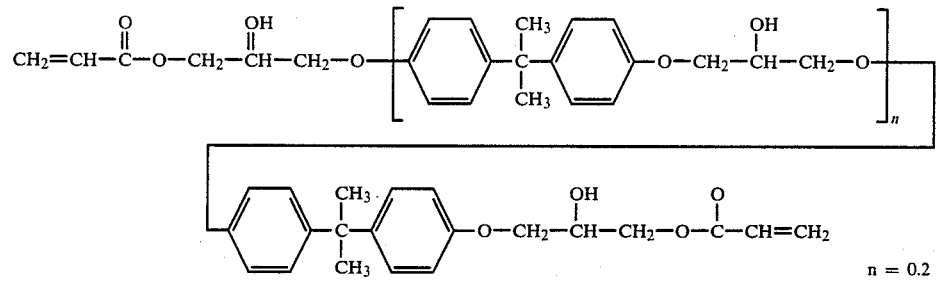

n = 0.2

This material has a viscosity of 9,000 poises at 25° C. and contains 0.02 equivalents epoxide/100 g. The material is formed from the reaction of one mole of diglycidyl ether of bisphenol-A reacted with two moles of acrylic acid.

Aside from substituted and unsubstituted acrylic acid being used to form the compound herein, hydroxyalkyl acrylate half esters of oxalic, malonic, succinic, glutaric, adipic, pimelic, suberic, azelaic, sebacic, phthalic, terephthalic, isophthalic acid and mixtures thereof are also operable. Thus, a generalized reaction for forming substituted or unsubstituted acrylate esters of an epoxy resin is as follows:

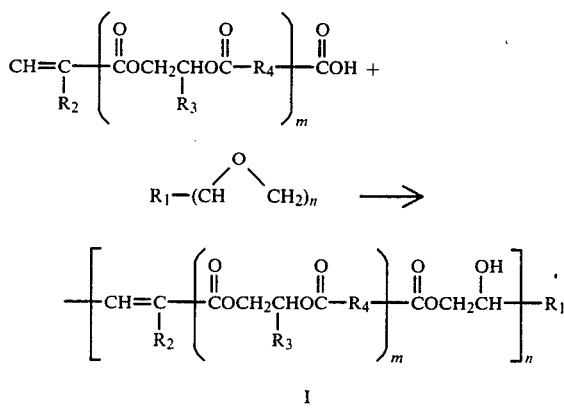

wherein m is 0 or 1; n is 1 to 4; $R_2$ and $R_3$ are H or $CH_3$; $R_4$ is $-CH=CH-$, $$-\underset{\underset{CH_2}{\|}}{C}-CH_2-,$$

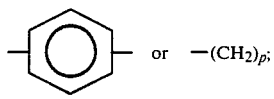

p is 0–6 and $R_1$ is an organic moiety with the valence of n. Examples of acrylate terminated prepolymers operable herein include, but are not limited to, 1,3-butylene glycol diacrylate, diethylene glycol diacryiate, 1,6-hexanedioi diacrylate, neopentyl glycol diacrylate, polyethylene glycol 200 diacrylate, tetraethylene glycol diacrylate, triethylene glycol diacrylate, pentaerythritol tetraacrylate, tripropylene glycol diacrylate, ethoxylated bisphenol-A diacrylate, trimetnylolpropane triacrylate, di-trimethylol propane tetraacrylate, triacrylate of tris(hydroxyethyl)isocyanate, dipentaerythritol hydroxypentaacrylate, pentaerythritol triacrylate, ethoxylated trimethylolpropane triacrylate, triethylene glycol dimethacrylate, ethylene glycol dimethacrylate, tetraethylene glycol dimetnacrylate, polyethylene glycol-200 dimethacrylate, 1,6-hexanediol dimethacrylate, neopentyl glycol dimethacrylate, polyethylene glycol-600 dimethyacrylate, 1,3-outylene glycol dimethacrylate, ethoxylated bisphenol-A dimethacrylate, trimethylolpropane trimethacrylate, diethylene glycol dimethacrylate, 1,4-butanediol diacrylate, diethylene glycol dimethacrylate, pentaerythritol tetramethacrylate, glycerin dimethacrylate, trimethylolpropane dimethacrylate, pentaerythritol trimethacrylate, pentaerythritol dimethacrylate and pentaerythritol diacrylate. Monoacrylates such as n-hexyl methacrylate, cyclohexyl methacrylate and tetrahydrofurfuryl methacrylate are also operable as reactive plasticizers herein. In the case where the reactive plasticizer (b) is an unsaturated polyester, conventional unsaturated polyesters can be used, such as those described in Kirk-Othmer, Encylopedia of Chemical Technology, 2nd Ed., Vol. 2, pp. 791–839, incorporated herein by reference. That is, conventional unsaturated polyesters operable herein are a class of soluble, linear, low molecular weight macromolecules which contain both carboxylic ester groups and carbon-carbon double bonds as recurring units along the main chain. These resins are usually prepared by condensation of (a) ethylenically unsaturated dicarboxylic acids or anhydrides to impart the unsaturation, (b) saturated dicarboxylic acids to modify the resin and (c) diols. They are represented by the structural formula:

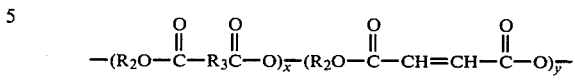

wherein $R_2$ and $R_3$ are alkylene or arylene radicals in the diol and saturated acid respectively, and x and y are variable numbers which depend upon the composition and condensation conditions. Polyester alkyds can be diluted to a fluid state with methacrylates or other vinyl monomers. These mixtures are capable of very rapid copolymerization to produce strong solids. This free-radical-initiated reaction proceeds via an addition mechanism involving the double bonds of both materials and leads to formation of a highly crosslinked structure.

The diol can be propylene glycol, dipropylene glycol, diethylene glycol, polypropylene glycol, polycaprolactone diol, butandiol polybutylene glycol or mixtures of glycols. When maleic anhydride is used, care must be paid to ensure isomerization of the maleate to fumarate. Maleate can be isomerized to fumarate catalytically or by the application of heat. However, use of isomerization catalysts can lead to crosslinking or other undesirable effects on the product. Fortunately, the polyesterification reaction is normally carried out at 200° C. or slightly higher, and at these temperatures isomerization is concurrent with polyesterification. Typical polyester cook times range from 6 to 16 hours at temperatures from 180° C. to as high as 230° C. Reaction temperatures much above 220° C. can be detrimental, leading to side reactions and poor color of the product.

Generally, substitution of fumarate for maleate as the unsaturated portion leads to higher flexural strength and modulus, higher hardness values, higher heat distortion temperatures and better chemical resistance in the cured systems. However, faster polymerization rates are also obtained. These differences can be equated to a higher crosslink density from the fumarate unsaturation.

Acid catalysts such as sulfuric acid or p-toluenesulfonic acid increase the rate of both esterification and isomerization, but usually cause color formation and other detrimental side reactions. For this reason catalysts are generally not used in high-temperature reactions. However, metal salts or organometallic compounds are used as catalysts for direct esterification. Numerous metal salts have been used for catalyst action including, but not limited to, tetrabutyl or tetraoctyl titanate or zirconate or stannous oxalate in combination with sodium and zinc acetates.

Mixtures of plasticizers in plasticizer (b) with each other are operable in weight ratios of 1 to 99 to 99 to 1. Additionally, when plasticizer (b) is used in combination with plasticizer (a), i.e., the epoxy resin, it is used in amounts ranging from 1 to 95, preferably 5 to 50% by weight of the total plasticizer. The addition of plasticizer (b) to plasticizer (a), i.e., the epoxy resin, yields greatly improved curing speed afteron fluxing as will be shown in an example hereinafter.

The thermal initiators used herein for curing plasticizer (b), for example, the acrylate terminated monomers, obigomers or prepolymers or the polyester portion of the reactive plasticizer are free radical initiators selected from substituted or unsubstituted pinacols, azo compounds, thiurams, organic peroxides and mixtures thereof. These initiators are added in amounts ranging from 0.01 to 10% by weight of the plasticizer.

The organic peroxides operable are of the general formula:

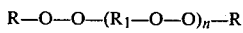

R—O—O—(R$_1$—O—O)$_n$—R wherein n=0 or 1, R is independently selected from hydrogen, aryl, alkyl, aryl carbonyl, alkaryl carbonyl, aralkyl carbonyl and alkyl carbonyl and R$_1$ is alkyl or aryl, said alkyl groups containing 1 to 20 carbon atoms.

Examples of operable organic peroxides include, but are not limited to, 2,5-dimethyl-2,5-di(t-butylperoxy)-hexane, 1,3-bis(t-butylperoxyisopropyl)benzene, 1,3-bis(cumylperoxyisopropyl)benzene, 2,4-dichlorobenzoyl peroxide, caprylyl peroxide, lauroyl peroxide, t-butyl peroxyisobutyrate, benzoyl peroxide, p-chlorobenzoyl peroxide, hydroxyheptyl peroxide, di-t-butyl diperphthalate, t-butyl peracetate, t-butyl perbenzoate, dicumyl peroxide, 1,1-di(t-butylperoxy)-3,3,5-trimethylcyclohexane and di-t-butyl peroxide.

Examples of azo compounds operable herein include, but are not limited to, commercially available compounds such as 2-t-butylazo-2-cyanopropane; 2,2'-azobis-(2,4-dimethyl-4-methoxy-valeronitrile); 2,2'-azobis-(isobutyronitrile); 2,2'-azobis(2,4-dimethylvaleronitrile) and 1,1'-azobis(cyclohexanecarbonitrile).

The thiurams operable as thermal initiators herein are of the formula:

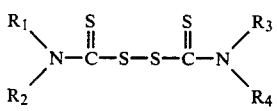

wherein R$_1$, R$_2$, R$_3$ and R$_4$ taken singly can be hydrogen, linear or branched alkyl having from 1 to about 12 carbon atoms, linear or branched alkenyl having from 2 to about 12 carbon atoms, cycloalkyl having from 3 to about 10 ring carbon atoms, cycloalkenyl having from 3 to about 10 ring carbon atoms, aryl having from 6 to about 12 ring carbon atoms, alkaryl having from 6 to about 12 ring carbon atoms, aralkyl having from 6 to about 12 ring carbon atoms and, when taken together, R$_1$ and R$_2$ and R$_3$ and R$_4$ can each be a divalent alkylene group —C$_n$H$_{2n}$— having from 2 to about 12 carbon atoms, a divalent alkenylene group —(C$_n$H$_{2n-2}$)— group having from 3 to about 10 carbon atoms, a divalent alkadienylene group —(C$_n$H$_{2n-4}$)— having from 5 to about 10 carbon atoms, a divalent alkatrienylene group —(C$_n$H$_{2n-6}$)— having from 5 to about 10 carbon atoms, a divalent alkyleneoxyalkylene group —(C$_x$H$_{2x}$OC$_x$H$_{2x}$)— having a total of from 4 to about 12 carbon atoms or a divalent alkyleneaminoalkylene group:

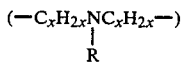

(—C$_x$H$_{2x}$NC$_x$H$_{2x}$—)
|
R having a total of from 4 to about 12 carbon atoms.

Operable thiurams include, but are not limited to, tetramethylthiuram disulfide, tetraethylthiuram disulfide, di-N-pentamethylenethiuram disulfide, tetrabutylthiuram disulfide, diphenyldimethylthiuram disulfide, diphenyldiethylthiuram disulfide and diethyleneoxythiuram disulfide and the like.

The substituted or unsubstituted pinacols operable herein as a thermal initiator have the general formula:

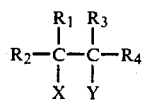

wherein R$_1$ and R$_3$ are the same or different substituted or unsubstituted aromatic radicals, R$_2$ and R$_4$ are substituted or unsubstituted aliphatic or aromatic radicals and X and Y which may be the same or different are hydroxyl, alkoxy or aryloxy.

Preferred pinacols are those wherein R$_1$, R$_2$, R$_3$ and R$_4$ are aromatic radicals, especially phenyl radical and X and Y are hydroxyl.

Examples of this class of compounds include, but are not limited to, benzopinacol, 4,4'-dichlorobenzopinacol, 4,4'-dibromobenzopinacol, 4,4'-diiodobenzopinacol, 4,4',4'',4'''-tetrachlorobenzopinacol, 2,4-2',4'-tetrachlorobenzopinacol, 4,4'-dimethylbenzopinacol, 3,3'-dimethylbenzopinacol, 2,2'-dimethylbenzopinacol, 3,4-3',4'-tetramethylbenzopinacol, 4,4'-dimethoxybenzopinacol, 4,4',4'',4'''-tetramethoxybenzopinacol, 4,4'-diphenylbenzopinacol, 4,4'-dichloro-4'',4'''-dimethylbenzopinacol, 4,4'-dimethyl-4'',4'''-diphenylbenzopinacol, xanthonpinacol, fluorenonepinacol, acetophenonepinacol, 4,4'-dimethylacetophenone-pinacol, 4,4'-dichloroacetophenonepinacol, 1,1,2-triphenyl-propane-1,2-diol, 1,2,3,4-tetraphenylbutane-2,3-diol, 1,2-diphenylcyclobutane-1,2-diol, propiophenone-pinacol, 4,4'-dimethylpropiophenonepinacol, 2,2'-ethyl-3,3'-dimethoxypropiophenone-pinacol, 1,1,1,4,4,4-hexafluoro-2,3-diphenyl-butane-2,3-diol.

As further compounds according to the present invention, there may be mentioned: benzopinacol-mono methylether, benzopinacol-mono-phenylether, benzopinacol and monoisopropyl ether, benzopinacol monoisobutyl ether, benzopinacol mono (diethoxy methyl) ether and the like The thermal initiators employed for plasticizer (a) the epoxy resin are thermal initiators selected from dicyandiamide, melamine, guanamine, polycarboxylic acid polyhydrazides, carboxylic acid imides, imidazole derivatives and BF$_3$ adducts. The thermal initiators for the epoxy resin plasticizer are added in amounts ranging from 0.01 to 10% by weight of the epoxy resin plasticizer.

The BF$_3$ adducts used herein as thermal initiators include, but are not limited to, C$_6$H$_5$NH$_2$.BF$_3$, 2,6-Et C$_6$H$_3$NH$_2$.BF$_3$, EtNH$_2$.BF$_3$, sec.-Bu$_2$NH.BF$_3$, Et$_2$NH.BF$_3$, (C$_6$H$_5$)$_3$P.BF$_3$, C$_6$H$_5$NMe$_2$BF$_3$, Pyridine.BF$_3$ and Et$_3$N.BF$_3$, Et$_2$O.BF$_3$, (HOCH$_2$CH$_2$)$_3$N.BF$_3$ and the like.

Accelerators for the epoxy resin thermal initiators such as monuron, chlorotoluron and similar substances are also operable and can be added in amounts ranging from 0.1 to 10 parts by weight of the epoxy resin plasticizer.

Photoinitiators for the epoxy resin plasticizer include, but are not limited to, onium salts such as sulfonium salts and iodonium salts.

Diaryliodonium salts operable herein as either a photoinitiator or a thermal initiator are those set out in U.S. Pat. No. 4,238,587, and it is understood that so much of the disclosure therein relative to the diaryliodonium salts is incorporated herein by reference. That is, the diaryliodonium salts which can be utilized in the practice of the invention are shown as follows:

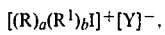  (1)

where R is a $C_{(6-13)}$ aromatic hydrocarbon radical, $R^1$ is a divalent aromatic organic radical, and Y is an anion, a is equal to 0 or 2, b is equal to 0 or 1 and the sum of a+b is equal to 1 or 2. Preferably, Y is an $MQ_d$ anion where M is a metal or metalloid, Q is a halogen radical and d is an integer equal to 4–6.

Radicals included within R of formula (1) can be the same or different aromatic carbocyclic radicals having from 6 to 20 carbon atoms, which can be substituted with from 1 to 4 monovalent radicals selected from $C_{(1-8)}$ alkoxy, $C_{(1-8)}$ alkyl, nitro, chloro, etc. R is more particularly phenyl, chlorophenyl, nitrophenyl, methoxyphenyl, pyridyl, etc. Radicals included by $R_1$ of formula (1) are divalent radicals such as

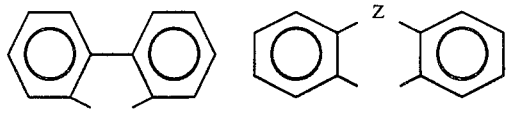

where Z is selected from —O—, —S—,

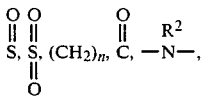

$R^2$ is $C_{(1-8)}$ alkyl or $C_{(6-13)}$ aryl, and n is an integer equal to 1–8 inclusive.

Metals or metalloids included by M of formula (1) are transition metals such as Sb, Fe, Sn, Bi, Al, Ga, In, Ti, Zr, Sc, V, Cr, Mn, Cs, rare earth elements such as the lanthanides, for example, Cd, Pr, Nd, etc., actinides, such as Th, Pa, U, Np, etc., and metalloids such as B, P, As, Sb, etc. Complex anions included by $MQ_d$ are, for example, $BF_4^-$, $PF_6^-$, $AsF_6^-$, $SbF_6^-$, $FeCl_4^-$, $SnCl_6^-$, $SbCl_6^-$, $BiCl_5^-$, etc.

Some of the diaryliodonium salts which can be used in the practice of the invention are as follows:

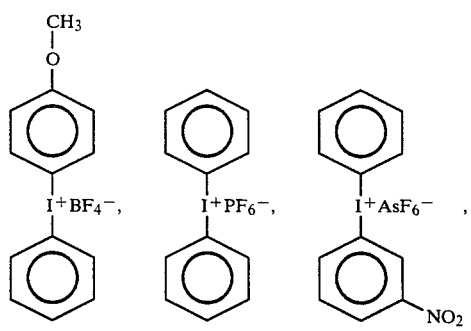

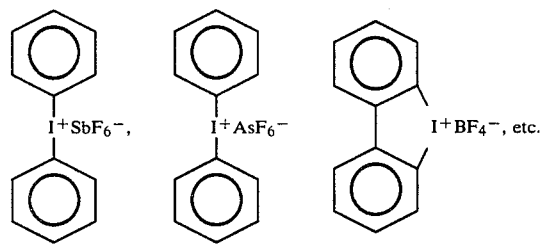

Another onium salt operable herein are the sulfonium salts having an $MF_6$ anion where M is P, As or Sb as disclosed in U.S. Pat. No. 4,417,061 incorporated hereby by reference. Examples of such salts include, but are not limited to:

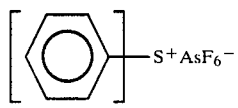

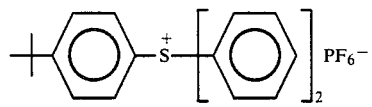

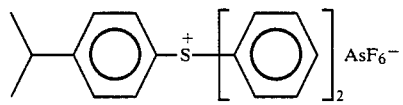

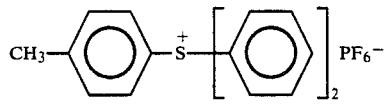

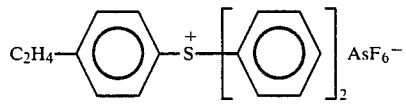

These onium salts are added as photoinitiators in an amount ranging from 0.01 to 10% by weight of the epoxy resin.

Preferred photoinitiators for plasticizer (b) are the aldehyde and ketone carbonyl compounds having at least one aromatic nucleous attached directly to the

group. Various photoinitiators include, but are not limited to, benzophenone, acetophenone, o-methoxybenzophenone, acenapthene-quinone, methyl ethyl ketone, valerophenone, hexanophenone, alpha-phenylbutyrophenone, p-morpholinopropionphenone, dibenzosuberone, 4-morpholinobenzophenone, 4'-morpholinodeoxybenzoin, p-diacetylbenzene, 4-aminobenzophenone, 4'-methoxyacetophenone, benzaldehyde, alpha-tetralone, 9-acetylphenanthrene, 2-acetylphenanthrene, 10-thioxanthenone, 3-acetylphenanthrene, 3-acetylindone, 9-fluorenone, 1-indanone, 1,3,5-triacetylbenzene, thioxanthen-9-one, xanthrene-9-one, 7-H-benz[de]anthracen-7-one, 1-naphthaldehyde, 4,4'-bis(dimethylamino)benzophenone, fluorene-9-one, 1'- acetonaphthone, 2'-acetonaphthone, 2,3-butanedione, triphenylphosphine, tri-o-tolylphosphine, acetonaphthone, benz[a]anthracene 7.12 dione, etc. Another class of photoinitiators is the benzoin alkyl ethers, such as benzoin methyl ether, benzoin ethyl ether, benzoin isopropyl ether and benzoin isobutyl ether. Still another class of photoinitiators are the dialkoxyacetophenones exemplified by 2,2-dimethoxy-2-phenylacetophenone and 2,2-diethoxy-2-phenylacetophenone. Benzil ketals such as benzil dimethyl ketals are also operable herein as photoinitiators. The photoinitiators or mixtures thereof are usually added in an amount ranging from 0.01 to 10% by weight of plasticizer (b).

Thus, when the plasticizer is a mixture of plasticizer (a) and (b), a mixture of photoinitiators or thermal initiators is employed (depending on whether radiation or heat is used) to obtain a fully thermoset product. A class of actinic light useful herein for curing is ultraviolet light and other forms of actinic radiation which are normally found in radiation emitted from the sun or from artificial sources such as Type RS sunlamps, carbon arc lamps, xenon arc lamps, mercury vapor lamps, tungsten halide lamps and the like. Ultraviolet radiation may be used most efficiently if the photocurable composition contains a suitable photoinitiator. Curing periods may be adjusted to be very short and hence commercially economical by proper choice of ultraviolet source, photoinitiator and concentration thereof, temperature and molecular weight and reactive group functionality of the plasticizer. Curing periods of about 1 second duration are possible, especially in thin film applications such as desired, for example, in coatings.

When UV radiation is used, an intensity of 0.0004 to 60.0 watts/$cm^2$ in the 200-400 nanometer region is usually employed. High energy ionizing radiation can also be used for the curing step without the use of photoinitiators in the instant invention. If high energy ionizing irradiation is used, e.g., electron beam, a dose in the range of 0.01-10 megarads is employed at a dose rate of $1.0 \times 10^4$-4,000 megarads/second. Any radiation having an energy of greater than 3.0 electron volts is operable to cause the curing reaction of the instant invention.

In practicing the invention, it is sometimes possible to use a thermal initiator for curing the plasticizer which decomposes at a temperature lower than the fluxing temperature of the plastisol, especially when the composition is quickly heated to the fluxing temperature. This is due to the fact that the fluxing rate is much faster than the curing rate at the fluxing temperature. Thus, one can heat quickly to the fluxing temperature, flux the plastisol and cool down below the decomposition temperature of the thermal initiator before curing occurs, thereby obtaining a thermoplastic plastisol ready to be cured to a thermoset on reheating.

The heating step to cure the fluxed solid plastisol is usually carried out for a period of 10 seconds to 30 minutes at a temperature of 100°-300° C., preferably 120°-200° C., which is sufficient to fully cure the composition to a solid thermoset product.

The heating step using a thermal initiator to cure the fluxed plastisol resin composition can be accomplished in several ways. In simple systems, the composition can be applied by manual means and heated in a forced air oven until a thermoset bond results.

Additionally and preferably, electromagnetic heating can be utilized as a faster and more efficient means of curing.

In practicing the instant invention, electromagnetic heating can be employed with the adhesive composition herein to adhere (1) plastic to plastic, (2) plastic to metal and (3) metal to metal. For example, dielectric heating can be used to bond (1) and (2) supra if the adhesive composition contains sufficient polar groups to heat the composition rapidly and allow it to bond the adherends. Inductive heating can also be used to bond (1), (2) and (3). That is, when at least one of the adherends is an electrically conductive or ferromagnetic metal, the heat generated therein is conveyed by conductance to the adhesive composition thereby initiating the cure to form a thermoset adhesive. In the instance where both adherends are plastic, it is necessary to add an energy absorbing material, i.e., an electrically conductive or ferromagnetic material, preferably in fiber or particle form (10-400 mesh) to the adhesive composition. The energy absorbing material is usually added in amounts ranging from 0.1 to 2 parts by weight, per 1 part by weight of the adhesive plastisol resin composition prior to fluxing. It is also possible to impregnate the plastic adherend at the bonding joint with particles of the energy absorbing material in order to use inductive heating, but care must be exercised that the plastic is not distorted.

The particulate electromagnetic energy absorbing material used in the adhesive composition when induction heating is employed can be one of the magnetizable metals including iron, cobalt and nickel or magnetizable alloys or oxides of nickel and iron and nickel and chromium and iron oxide. These metals and alloys have high Curie points (730°-2,040° F.).

Electrically conductive materials operable herein when inductive heating is employed include, but are not limited to, the noble metals, copper, aluminum, nickel, zinc as well as carbon black, graphite and inorganic oxides.

There are two forms of high frequency heating operable herein, the choice of which is determined by the material to be adhered. The major distinction is whether or not the material is a conductor or non-conductor of electrical current. If the material is a conductor, such as iron or steel, then the inductive method is used. If the material is an insulator, such as wood, paper, textiles, synthetic resins, rubber, etc., then dielectric heating can also be employed.

Most naturally occurring and synthetic polymers are non-conductors and, therefore, are suitable for dielectric heating. These polymers may contain a variety of dipoles and ions which orient in an electric field and rotate to maintain their alignment with the field when the field oscillates. The polar groups may be incorporated into the polymer backbone or can be pendant side groups, additives, extenders, pigments, etc. For example, as additives, lossy fillers such as carbon black at a one percent level can be used to increase the dielectric response of the plastisol adhesive. When the polarity of the electric field is reversed millions of times per second, the resulting high frequency of the polar units generates heat within the material.

The uniqueness of dielectric heating is in its uniformity, rapidity, specificity and efficiency. Most plastic heating processes such as conductive, convective or infrared heating are surface-heating processes which need to establish a temperature within the plastic by subsequently transfering the heat to the bulk of the plastic by conduction. Hence, heating of plastics by these methods is a relatively slow process with a nonuniform temperature resulting in overheating of the surfaces. By contrast, dielectric heating generates the heat within the material and is therefore uniform and rapid, eliminating the need for conductive heat transfer. In the dielectric heating system herein the electrical frequency of the electromagnetic field is in the range 1–3,000 megahertz, said field being generated from a power source of 0.5–1,000 kilowatts.

Induction heating is similar, but not identical, to dielectric heating. The following differences exist: (a) magnetic properties are substituted for dielectric properties; (b) a coil is employed to couple the load rather than electrodes or plates; and (c) induction heaters couple maximum current to the load. The generation of heat by induction operates through the rising and falling of a magnetic field around a conductor with each reversal of an alternating current source. The practical deployment of such field is generally accomplished by proper placement of a conductive coil. When another electrically conductive material is exposed to the field, induced current can be created. These induced currents can be in the form of random or "eddy" currents which result in the generation of heat. Materials which are both magnetizable and conductive generate heat more readily than materials which are only conductive. The heat generated as a result of the magnetic component is the result of hysteresis or work done in rotating magnetizable molecules and as a result of eddy current flow. Polyolefins and other plastics are neither magnetic nor conductive in their natural states. Therefore, they do not, in themselves, create heat as a result of induction.

The use of the eletromagnetic induction heating method for adhesive bonding of plastic structures has proved feasible by interposing selected eletromagnetic energy absorbing materials in an independent adhesive composition layer or gasket conforming to the surfaces to be bonded, electromagnetic energy passing through the adjacent plastic structures (free of such energy absorbing materials) is readily concentrated and absorbed in the adhesive composition by such energy absorbing materials thereby rapidly initiating cure of the adhesive plastisol composition to a thermoset adhesive.

Electromagnetic energy absorbing materials of various types have been used in the electromagnetic induction heating technique for some time. For instance, inorganic oxides and powdered metals have been incorporated in bond layers and subjected to electromagnetic radiation. In each instance, the type of energy source influences the selection of energy absorbing material. Where the energy absorbing material is comprised of finely divided particles having ferromagnetic properties and such particles are effectively insulated from each other by particle containing nonconducting matrix material, the heating effect is substantially confined to that resulting from the effects of hysteresis. Consequently, heating is limited to the "Curie" temperature of the ferromagnetic material or the temperature at which the magnetic properties of such material cease to exist.

The electromagnetic adhesive composition of this invention may take the form of an extruded ribbon or tape, a molded gasket or cast sheet. In liquid form it may be applied by brush to surfaces to be bonded or may be sprayed on or used as a dip coating for such surfaces.

The foregoing adhesive plastisol composition, when properly utilized as described hereinafter, results in a one component, solvent free bonding system which permits the joining of metal or plastic items without costly surface pretreatment. The electromagnetically induced bonding reaction occurs rapidly and is adaptable to automated fabrication techniques and equipment.

To accomplish the establishment of a concentrated and specifically located heat zone by induction heating for bonding in accordance with the invention, it has been found that the electromagnetic adhesive plastisol compositions described above can be activated and a bond created by an induction heating system operating with an electrical frequency of the electromagnetic field of from about 5 to about 30 megacycles and preferably from about 15 to 30 megacycles, said field being generated from a power source of from about 1 to about 30 kilowatts, and preferably from about 2 to about 5 kilowatts. The electromagnetic field is applied to the articles to be bonded for a period of time of less than about 2 minutes.

As heretofore mentioned, the electromagnetic induction bonding system and improved electromagnetic adhesive compositions of the present invention are applicable to the bonding of metals, thermoplastic and thermoset material, including fiber reinforced thermoset material.

The examples herein will demonstrate the following. To illustrate the advantage of the reactive poly(phenylene oxide) plastisol, poly(2,6-dimethylphenylene oxide) powder was first dispersed in a diglycidyl ether of bisphenol-A (Epon-828) in the presence of dicyandiamide as a hardener to form a storage stable dispersion. This dispersion was found to have a fluxing temperature around 135° C.–140° C. At or above this temperature, the dispersion turns to a continuous solid in a few seconds. This continuous solid is a very flexible plasticized poly(phenylene oxide) and can be cured at a temperature at or above 150° C. to form a semi-interpenetration network. The cured material has excellent mechanical properties.

In a conventional molding process, the polymer has to be melted to provide the adequate viscosity. The melt temperature of poly(2,6-dimethylphenylene oxide) is higher than its decomposition point. Heretofore, it was impossible to process this polymer at a temperature as low as 135° C. as taught herein.

Another example used in this application is based on the dispersion of poly(2,6-dimethylphenylene oxide) in ethoxylated bisphenol-A dimethacrylate. The dispersion is stable at room temperature and turns to a flexible, tough, continuous solid at a temperature at or above 135° C. The fluxed solid can be crosslinked to a rigid plastic after the curing reaction. The curing can be done thermally or photochemically, depending on the curing agent used.

To further illustrate an advantage, the dispersion from poly(2,6-dimethylphenylene oxide) and diglycidyl ether of bisphenol-A in the presence of dicyandiamide as a curing agent was used as a matrix to prepare a sheet molding compound (SMC). The process includes, first, spraying the dispersion on a glass fiber fabric; second, fluxing the matrix supported by fabric at 145° C. in less than a minute to prepare a storage stable B-staged prepreg; and, finally, laminating several layers of prepreg and curing the laminate at 200° C. for 30 minutes under pressure. The cured composite is extremely tough and useful as a primary structural component.

Prepregs account for almost one half of all advanced composite tonnage and three quarters of the dollar value. Prepregs are ready to mold material in sheet form. They consist of a reinforcing fabric which may be cloth, mat or paper, impregnated with a resin. The resin is then partially cured to the B-stage. The compound may be later stored and supplied to the fabricator. The added cost for making prepreg is from the partial curing of the impregnating matrix. Also, B-staged material is still chemically active. Therefore, refrigeration is needed to store the prepreg.

To avoid the cost of partial cure and refrigeration storage, the best way to prepare a prepreg is to shorten the B-stage formation without partially curing the matrix. This invention relates to the use of reactive poly(phenylene oxide) plastisols to prepare a prepreg in a very short period, i.e., by fluxing, which is not obtainable by the conventional method of partial cure.

In forming prepregs and composites in the instant invention, aside from the conventional cloth fibers, various other fibrous materials including, but not limited to, carbon fibers, glass fibers, silicon carbides, boron nitriles, metal fibers, whiskers and the like in fabric, chopped or continuous filament form can be used.

The following examples will help to explain, but expressly not limit, the instant invention. Unless otherwise noted, all parts and percentages are by weight.

EXAMPLE 1

To 100 g of diglycidyl ether of bisphenol-A (Araldite-6004 from Ciba Geigy) was blended 6 g of dicyandiamide to form a thermally curable reactive plasticizer. To 6.5 g of this reactive epoxy plasticizer was dispersed 3.5 g of poly(2,6-dimethylphenylene oxide) (PPO) to provide a storage stable dispersion (reactive plastisol). Using the dielectrometer, three transitions in dielectric loss and capacitance curves at 90° C., 140° C. and 180° C. were observed upon heating. At 90° C. and 140° C. the liquid reactive plastisol changes to an opaque gel and then a continuous solid with high clearance, respectively. These two transitions are typical phenomena of a plastisol, when exposed to heat. At 180° C., the epoxy plasticized poly(2,6-dimethylphenylene oxide) began to cure and form a crosslinked plastic very quickly. To prove these transitions, 10 g of the reactive plastisol was heated at 145° C. for 3 minutes to obtain a flexible, tough, continuous mass, which is an epoxy-plasticized polymer. The plasticized polymer, after curing at 200° C. for 30 minutes, gave a rigid, strong thermoset with excellent physical properties. (Heat deflection temperature = 195° C.; tensile strength = $1.1 \times 10^4$ psi.; flexural strength = $1.8 \times 10^4$ psi.; flexural modulus = $4.4 \times 10^5$ psi.)

EXAMPLE 2

A glass fiber fabric was sprayed with a very thin layer of the reactive plastisol obtained from Example 1. The impregnated glass fiber fabric was then heated at 145° C. for 60 seconds to give a flexible, dry storage stable prepreg. After laminating several layers of prepreg, the laminate was cured under pressure at 200° C. for 30 minutes to form an extremely tough composite.

EXAMPLE 3

To 100 g of ethoxylated bisphenol-A dimethacrylate, 0.1 g of benzoyl peroxide was dissolved to form a thermally curable reactive plasticizer. To 6.5 g of this reactive plasticizer, 3.5 g of poly(2,6-dimethylphenylene oxide) was dispersed to provide a storage stable dispersion (reactive plastisol). Heating this reactive plastisol at 150° C., the dispersion turned to a flexible solid very quickly and then to a cured mass in 5 minutes.

EXAMPLE 4

A glass fiber fabric was sprayed with a liquid reactive plastisol from Example 3. This impregnated fabric was heated at 140° C. for a minute to generate a storage stable flexible prepreg. Due to air inhibition, no crosslinking occurred to this prepreg during the preparation. The laminate of this prepreg gave a rigid composite after curing at 180° C. under pressure without air.

EXAMPLE 5

8 g of a liquid reactive plastisol from Example 1 were mixed with 2 g of the liquid reactive plastisol from Example 3. The resulting reactive plastisol was storage stable at room temperature for at least 3 months. Heating this reactive plastisol at 150° C., the dispersion turned to fluxed flexible solid in 2 minutes. This flexible solid cured to a rigid solid at 200° C. for 30 minutes. The cured material had $2.94 \times 10^5$ psi. of tensile modulus, $5.2 \times 10^3$ psi of tensile strength, $4.2 \times 10^5$ psi. of flexural modulus and $1.65 \times 10^3$ psi. of flexural strength.

EXAMPLE 6

3.5 g of powdered PPO was dispersed in 6.5 g of ethoxylated bisphenol-A dimethacrylate in the presence of 4% of 2,2-diethoxy-2-phenylacetophenone as a photoinitiator. The dispersion was fluxed to a flexible solid at 150° C. in 5 minutes. The fluxed solid was cured in a chamber having a Sylvania medium pressure mercury lamp power = 60 watts/in. in a parabolic reflector for 2 minutes. A thermoset film resulted.

I claim:

1. A reactive plastisol dispersion composition consisting of
   (1) poly(phenylene oxide) (PPO) in powder form, which is insoluble in the reactive plasticizer at room temperature and plasticizable at a temperature at or above the fluxing temperature;
   (2) a liquid reactive plasticizer member of the group consisting of (a) at least one epoxide resin having an average of more than one epoxide group in the molecule and (b) a mixture of (a) and at least one liquid monomer, oligomer or prepolymer containing at least one ethylenically unsaturated group; said liquid reactive platicizer being capable of solvating the PPO at the fluxing temperature and being present in an amount ranging from 5 to 2,000 parts per 100 parts by weight of (1); and
   (3) 0.01 to 10% by weight of (2) of either a thermal initiator or photoinitiator for plasticizers present in the composition.

2. The composition of claim 1 wherein (3) is a thermal initiator.

3. The composition of claim 1 wherein (3) is a photoinitiator.

4. The composition of claim 1 wherein (2) is (a) and (3) is a thermal initiator.

5. The composition of claim 1 wherein (2) is (b) and (3) is a thermal initiator.

6. The process of forming a solidified homogeneous mass which comprises admixing a reactive plastisol dispersion composition consisting of
   (1) poly(phenylene oxide) (PPO) in powder form, which is insoluble in the reactive plasticizer at room temperature and plasticizable at a temperature at or above the fluxing temperature;

(2) a liquid reactive plasticizer member of the group consisting of (a) at least one epoxide resin having an average of more than one epoxide group in the molecule and (b) a mixture of (a) and at least one liquid monomer, oligomer or prepolymer containing at least one ethylenically unsaturated group; said liquid reactive plasticizer being capable of solvating the PPO at the fluxing temperature and being present in an amount ranging from 5 to 2,000 parts per 100 parts by weight of (1); and (3) 0.01 to 10% by weight of (2) of either a thermal initiator or photoinitiator for plasticizers present in the composition;

and, thereafter, heating the admixture for a time sufficient to flux the mass.

7. The process of claim 6 where in the composition, (2) is (a).

8. The process of claim 6 where in the composition, (2) is (b).

9. A composition consisting of a reactive, solid, homogeneous, fluxed plastisol formed from
(1) poly(phenylene oxide) (PPO) in powder form, which is insoluble in the reactive plasticizer at room temperature and plasticizable at a temperature at or above the fluxing temperature;
(2) a liquid reactive plasticizer member of the group consisting of (a) at least one epoxide resin having an average of more than one epoxide group in the molecule and (b) a mixture of (a) and at least one liquid monomer, oligomer or prepolymer containing at least one ethylenically unsaturated group; said liquid reactive plasticizer being capable of solvating the PPO at the fluxing temperature and being present in an amount ranging from 5 to 2,000 parts per 100 parts by weight of (1); and
(3) 0.01 to 10% by weight of (2) of either a thermal initiator of photoinitiator for plasticizers present in the composition.

10. The composition of claim 9 wherein (3) is a thermal initiator.

11. The composition of claim 9 wherein (3) is a photoinitiator.

12. The composition of claim 9 wherein (2) is (a) and (3) is a thermal initiator.

13. The composition of claim 9 wherein (2) is (b) and (3) is a thermal initiator.

14. The process of forming a fiber-reinforced composite which comprises impregnating a fibrous material with a reactive plastisol dispersion composition consisting of
(1) poly(phenylene oxide) (PPO) in powder form, which is insoluble in the reactive platicizer at room temperature and plasticizable at a temperature at or above the fluxing temperature;
(2) a liquid reactive plasticizer member of the group consisting of (a) at least one epoxide resin having an average of more than one epoxide group in the molecule and (b) a mixture of (a) and at least one liquid monomer, oligomer or prepolymer containing at least one ethylenically unsaturated group; said liquid reactive plasticizer being capable of solvating the PPO at the fluxing temperature and being present in an amount ranging from 5 to 2,000 parts per 100 parts by weight of (1); and
(3) 0.01 to 10% by weight of (2) of a thermal initiator for plasticizers present in the composition;

and, thereafter, heating said impregnated fibrous material to a temperature in the range 100°–300° C. for a time sufficient to cause the composition to flux and form a thermoset composite.

15. The process of claim 14 where in the composition, (2) is (a).

16. The process of claim 14 where in the composition, (2) is (b).

17. The process of forming a fiber-reinforced prepreg which comprises impregnating a fibrous material with a reactive plastisol dispersion composition consisting of
(1) poly(phenylene oxide) (PPO) in powder form, which is insoluble in the reactive plasticizer at room temperature and plasticizable at a temperature at or above the fluxing temperature;
(2) a liquid reactive plasticizer member of the group consisting of (a) at least one epoxide resin having an average of more than one epoxide group in the molecule and (b) a mixture of (a) and at least one liquid monomer, oligomer or prepolymer containing at least one ethylenically unsaturated group; said liquid reactive plasticizer being capable of solvating the PPO at the fluxing temperature and being present in an amount ranging from 5 to 2,000 parts per 100 parts by weight of (1); and
(3) 0.01 to 10% by weight of (2) of either a thermal initiator or photoinitiator for plasticizers present in the composition;

heating said impregnated fibrous material to a temperature in the range 100°–300° C. for a time sufficient to cause the composition to flux.

18. The process of forming a fiber-reinforced composite which comprises impregnating a fibrous material with a reactive plastisol dispersion composition consisting of
(1) poly(phenylene oxide) (PPO) in powder form, which is insoluble in the reactive plasticizer at room temperature and plasticizable at a temperature at or above the fluxing temperature;
(2) a liquid reactive plasticizer member of the group consisting of (a) at least one epoxide resin having an average of more than one epoxide group in the molecule and (b) a mixture of (a) and at least one liquid monomer, oligomer or prepolymer containing at least one ethylenically unsaturated group; said liquid reactive plasticizer being capable of solvating the PPO at the fluxing temperature and being present in an amount ranging from 5 to 2,000 parts per 100 parts by weight of (1); and
(3) 0.01 to 10% by weight of (2) of a photoinitiator for plasticizers present in the composition;

heating said impregnated fibrous material to a temperature sufficient to cause the composition to flux and, thereafter, exposing said composition to UV radiation for a time sufficient to form a thermoset fiber-reinforced composite.

* * * * *